United States Patent
Akinfiev et al.

(10) Patent No.: US 7,341,122 B2
(45) Date of Patent: Mar. 11, 2008

(54) ACTUATOR FOR A WORKING ELEMENT, PARTICULARLY A WALKING ROBOT AND THE METHOD OF CONTROLLING SAID ACTUATOR

(75) Inventors: Theodore Akinfiev, Madrid (ES); Manuel Armada Rodríguez, Madrid (ES); Roemi Emilia Fernández Saavedra, Madrid (ES)

(73) Assignee: Consejo Superior de Investigaciones Cientificas, Madrid (ES)

( * ) Notice: Subject to any disclaimer, the term of this patent is extended or adjusted under 35 U.S.C. 154(b) by 0 days.

(21) Appl. No.: 10/996,338

(22) Filed: Nov. 23, 2004

(65) Prior Publication Data

US 2005/0127686 A1    Jun. 16, 2005

Related U.S. Application Data (63) Continuation of application No. PCT/ES03/00244, filed on May 23, 2003.

(30) Foreign Application Priority Data

May 24, 2002    (ES) ................................ 200201197

(51) Int. Cl.
  *B62D 51/06*    (2006.01)
  *F16H 21/18*    (2006.01)
(52) U.S. Cl. .............................. 180/8.5; 180/8.6; 74/45
(58) Field of Classification Search ................. 180/8.5, 180/8.6; 74/45
  See application file for complete search history.

(56) References Cited

U.S. PATENT DOCUMENTS

| | | | | | |
|---|---|---|---|---|---|
| 4,503,924 | A | * | 3/1985 | Bartholet et al. | 180/8.6 |
| 4,511,011 | A | * | 4/1985 | Bartholet | 180/8.6 |
| 4,629,440 | A | * | 12/1986 | McKittrick et al. | 446/356 |
| 4,680,022 | A | * | 7/1987 | Hoshino et al. | 446/487 |

(Continued)

FOREIGN PATENT DOCUMENTS

EP    0433096 A2    12/1990

(Continued)

OTHER PUBLICATIONS

Takemae Kunitaka, Sliding Walk Doll, Patent Abstracts of Japan, Publn. No. 01256991, Oct. 13, 1989.

(Continued)

*Primary Examiner*—Christopher P. Ellis
*Assistant Examiner*—Marlon Arce-Diaz
(74) *Attorney, Agent, or Firm*—Klauber & Jackson L.L.C.

(57) ABSTRACT

The invention relates to an actuator which is characterized in that the kinematic connection between the motor and the working element of the robot comprises a mobile link which is pivot fixed to the base of the actuator, a runner which is mounted to the mobile link and which may slide radially along the length thereof and a lever arm which is kinematically connected to the motor and which is hinge-connected to the runner by means of a pin. In this way, the rotation axes of the mobile link, the lever arm and the pin are parallel and said mobile link is kinematically connected to the working element. The distance between the lines that run alongside the rotation axis of the mobile link and the rotation axis of the lever arm may be greater or smaller than the length of the lever arm.

21 Claims, 11 Drawing Sheets

U.S. PATENT DOCUMENTS

| | | | |
|---|---|---|---|
| 4,834,200 A | | 5/1989 | Kajita |
| 5,158,493 A | * | 10/1992 | Morgrey .................... 446/355 |
| 5,253,541 A | * | 10/1993 | Mangle et al. ................ 74/41 |
| 5,423,708 A | * | 6/1995 | Allen ........................ 446/356 |
| 5,739,655 A | | 4/1998 | Torii et al. |
| 6,962,220 B2 | * | 11/2005 | Takenaka et al. ............ 180/8.6 |

FOREIGN PATENT DOCUMENTS

| | | |
|---|---|---|
| ES | 1018896 | 2/1992 |
| FR | A-2500560 | 2/1981 |
| GB | 2150451 A | 7/1985 |
| WO | WO01/17631 | 3/2001 |

OTHER PUBLICATIONS

Kobayashi Kengo, Three Dimensional Kinetic Mechanism for Wall Face Walking Robot, Patent Abstracts of Japan, Publn. No. 04256589, Sep. 11, 1992.

Chiyou, Jintei; Bipedalism Robot, Patent Abstracts of Japan, Publn. No. 07227482, Aug. 29, 1995.

Cho Jintei; Walking Robot Toy; Patent Abstracts of Japan, Publn. No. 2002306858, Apr. 13, 2001.

Fratschner, Verlag, W. Maschinenelemente, S. 389, 390 (1961).

* cited by examiner

ACTUATOR FOR A WORKING ELEMENT, PARTICULARLY A WALKING ROBOT AND THE METHOD OF CONTROLLING SAID ACTUATOR

RELATED APPLICATIONS

The present application is a Continuation of co-pending PCT Application No. PCT/ES03/00244, filed May 23, 2003, which in turn, claims priority from Spanish Application Serial No. 200201197, filed May 24, 2002. Applicants claim the benefits of 35 U.S.C. §120 as to the PCT application and priority under 35 U.S.C. §119 as to said Spanish application, and the entire disclosures of both applications are incorporated herein by reference in their entireties.

FIELD OF THE INVENTION

The invention belongs to the mechanical engineering field and may be particularly used in robotics, automation devices, pace actuators and other devices.

BACKGROUND OF THE INVENTION

The following are normally used in known technical solutions (1-2). Actuator for the legs of a walking robot, for the most part biped robots, with a mobile element, with a motor located in the mobile element, with a leg base element, which is connected to the mobile element by means of a rotation joint kinematically connected to the motor.

In these solutions the actuator motor along with a constant gear reducing box should compensate the torque produced by the gravitational force. The torque produced by the gravitational force may be compensated for by using small motors with high reduction ratios, but there is also the inconvenience that the speed of the leg is greatly limited. Another possibility is to compensate the torque produced by the gravitational force using big motors with low reduction ratios, but this has the inconvenience that it increases the weight of the robot and the energy consumption thereof.

1. Articulated structure for legged walking robot
    Patent Number EP0433096
    Publication date 19 Jun. 1991
    Inventors: Gomi Hirosi, Kumagai Tomharu,
    Hirose Masto, Nishikawa Masao
    B25J5/00; B25J11/00; G05D1/10
2. Method and apparatus for dynamic walking control of robot
    U.S. Pat. No. 4,834,200
    Publication date 30 May 1989
    Inventor: Kajita Syuji
    B25J5/00; B62D57/02

DESCRIPTION OF THE INVENTION

Brief Description of the Invention

Actuator that differs in that the kinematic connection between the motor and the working element of the robot has a mobile link, fastened at the base of the actuator with the possibility of rotation, a runner mounted on the mobile link with the possibility of sliding radially along the entire length thereof, a lever arm kinematically connected to the motor, hinge-connected to the runner by means of a pin, in such a way that the rotation axis of the mobile link, of the lever arm and of the pin are parallel and the mobile link is kinematically connected to the working element.

The distance between the lines that run along the entire rotation axis of the lever arm may be longer or shorter than the length of the lever arm.

Detailed Description of the Invention

The purpose of the invention is the reduction of the power of the actuator motor, the reduction of energy consumption and increase the operating speed of the actuator.

In order to achieve the purpose of the invention, the actuator of the working element, mainly a walking robot, has a motor (2) fastened to the base (1) and is connected to the control system. The motor (2) is kinematically connected to the working element (4). Said kinematic connection between the motor (2) and the working element (4) has a mobile link (5) fastened to the base (1) with the possibility of rotation, the runner (6) mounted on the mobile link (5) and the lever arm (7) connected kinematically to the motor (2). The runner (6) is radially fastened to the mobile link (5). The mobile link (5) is kinematically connected to the working element (4). Said kinematic connection may be made as a reducer, a rack and pinion mechanism, chain or belt pace, etc.; in the simplest case this kinematic connection may be made with the help of direct fastening of the working element on the mobile link. The rotation axes of the mobile link (5), of the lever arm (7) and of the pin (8) are parallel (when a spherical pin is used, this latter conditioning of the parallelity of the rotation axes of the pin is done automatically).

The distance between the lines that run along the entire rotation axis of the lever arm (7) may be shorter than the length of the lever arm (7).

The distance between the lines that run along the entire rotation axis of the mobile link (5) and along the entire rotation axis of the lever arm (7) may be longer than or equal to the length of the lever arm (7).

These technical solutions may allow the reduction of the motor power, reduce the energy consumption and increase the operating speed of the actuator at the expense of the pace ratio between the motor (2) and the working element (4) being variable and essentially depending on the rotation angle of the lever arm (7).

The lever arm (7) may be provided with an adjusting device, that ensures the possibility of adjusting the length of the lever arm (7). This device may be made, for example, in the form of an adjusting rod (9) with left thread in one end and right thread in the other end, and the responding parts with the corresponding thread, which makes it possible to carry out changes of the length of the lever arm (7) when rotating the adjusting rod (9). The adjusting device of the lever arm (7) may have an adjusting motor (10) connected to the control system. In the example considered the adjusting motor (10) may be fastened on one of the responding parts and kinematically connected to the adjusting rod (9), for example, with the help of spur gears with straight teeth. This makes it possible to optimally adjust the pace ratio by changing the load conditions. In this case, the control system does the adjusting taking into account the information of the position of the adjusting rod (9), that is received from the position sensor of the adjusting motor (10).

The actuator may have a sensor of the rotation angle of the motor (2), in such a way that this sensor is connected to the control system (3). The actuator may have a sensor of the rotation angle of the adjusting motor (10), in such a way that this sensor is connected to the control system (3). The actuator may have a sensor of the angle between the lever arm (7) and the mobile link (5), in such a way that this sensor is connected to the control system (3). The actuator may contain a sensor of the angle between the lever arm (7) and the base (1), in such a way that this sensor is connected to the control system (3).

The kinematic connection between the motor (2) and the lever arm (7) may have a reducer with a transmitting ratio higher than the unit or lower than the unit. The kinematic connection between the mobile link (5) and the working element (4) may have a reducer with a transmitting ratio higher than the unit or lower than the unit. The kinematic connection between the mobile link (5) and the working element (4) may have a rack and pinion mechanism, which does not exclude the presence of a reducer (with a transmitting ratio higher than the unit or lower than the unit) in this kinematic circuit (for example, between the mobile link and the sprocket.) The actuator may also have a system of elastic elements. The system of elastic elements may in turn have one or several elastic elements. At least one elastic element (11) may be fastened with one end to the mobile link (5), and at the other end to the base (1) of the actuator. One end of the elastic element (11) may be fastened to the working element of the robot (4) and the second end may be fastened to the base (1) of the actuator. The system of elastic elements may be adjusted in such a way that the mobile link (5) is in stable equilibrium in the positions, when the lever arm (7) is placed parallel to the mobile link (5).

The actuator may be made in such a way that it has at least one mobile element (11), one end of which is connected to the base and the other end is kinematically connected to the lever arm (7) or the motor (2). In this case, the system of elastic elements may be adjusted in such a way that the lever arm (7), is in a stable equilibrium state in positions when the lever arm (7) is parallel to the mobile link (5) and is oriented in the direction of the rotation axis of the mobile link (5) and in an unstable equilibrium state in positions when the lever arm (7) is parallel to the mobile link (5) and is oriented in the direction contrary to the rotation axis of the mobile link (5).

The presence of elastic elements makes it possible to additionally reduce energy consumption and to increase the operating speed at the expense of the inertia forces in the moving process being totally or partially compensated for by the elastic elements and not by the motor.

The actuator may have fasteners of one or several positions of the working element (4). Establishing the position of the working element may be done in relation to the base (1) (this variation is preferable since it ensures greater precision in the positioning), in relation to the mobile link (5) or in relation to the lever arm (7). Besides, other variations of establishing the position of the working element (4) are possible. Establishment thereof may be done at the expense of the fastening of the lever arm (7) or of the mobile link (5) in relation to the base (1) or between them themselves. Mechanical latches may be used as the fastener (12). These mechanical latches are comprised of two parts. One of the parts may be fastened rigidly to the working element (4) and the other part may be flexibly fastened (for automatic fastening) to the base (1) and be provided with a control system (3) of the electromagnet (in order to unfasten the connection). Another variation of the fastener (12) may be carried out, when one of the parts of the fastener (fastened, for example, to the base) represents an electromagnet connected to the control system and the responding part is an iron platform fastened rigidly to the working element (4), in such a way that in a certain position of the working element, the electromagnet is going to interact with this platform.

The use of fasteners makes it possible to reduce energy consumption at the expense that during stoppage the motor (2) of the actuator may be disconnected. An additional advantage of the user of fasteners is the increase of the precision of the positioning of the working element (4) above all in the case when the fastening thereof is done in connection with the base (1).

Description of the Operation of the Device

Figure 1:
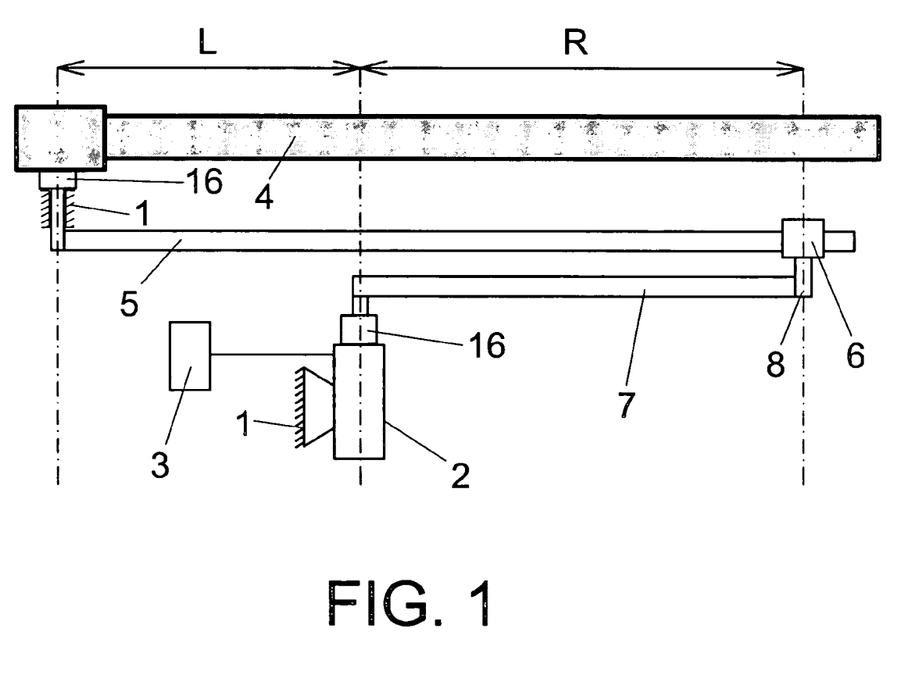
FIG. 1. The length of the lever arm (R) is longer than the distance (L) between the rotation axes of the mobile link and the lever arm FIG. 2. Dependency of the pace ratio (K) on the rotation angle of the lever arm ϕ for the case of R>L FIG. 3. Device for adjusting the length of the lever arm FIG. 4. The length of the lever arm (R) is shorter than the distance (L) between the rotation axes of the mobile link and the lever arm FIG. 5. Dependency of the pace ratio (K) on the rotation angle of the lever arm ϕ for the case of R<L FIG. 6. End positions of the mobile link when R<L FIG. 7. Example when the elastic element is used FIG. 8. Example when the elastic element is used FIG. 9. Example when the elastic element is used FIG. 10. Example of embodiment of the fastener of the working element
1. Base
2. Motor
3. Control system
4. Working element
5. Mobile link
6. Runner (Slider)
7. Lever arm
8. Pin
9. Adjusting rod
10. Adjusting motor
11. Elastic element
12. Fastener
13. Initial position
14. Final position
15. Middle position
16. Reducer
17. Electromagnet
18. Responding part of the fastener
19. Part interacting with the magnet of the fastener FIG. 11. Example of an embodiment of the working element into the leg of the robot.

Condition I. Let us first consider the case when the length of the lever arm (7) is longer than the distance between the lines that run along the entire rotation axis of the mobile link (5) and along the entire rotation axis of the lever arm (7) (FIG. 1).

In the initial position all the elements of the actuator are in an inoperative state. The control system (3) applies a voltage with a certain polarity to the motor (2) and the motor (2) begins to rotate putting the lever arm (7) connected kinematically to the motor (2) into movement. The lever arm puts the runner (6) in movement by means of the pin (8). The runner begins to rotate the mobile link (5) and to slide simultaneously along this mobile link. This mobile link (5) puts the working element (4) into movement by means of the kinematic connection (immediately by means of the reducer, a rack and pinion mechanism, etc.) When the working element (4) reaches the established position, determined by the control system (3) by way of signals of the sensor (for example, of the sensor of the position of the mobile link with respect to the base, of the sensor of the position of the motor, etc.) or of the built into the control system, the control system (3) disconnects the voltage applied to the motor (2). In order to keep the working element (4) in this position, the control system (3) may connect the condition of keeping the motor in the present position with the help of the reverse connection by means of one of the position sensors (for example, the position sensor of the motor) instead of disconnecting the voltage.

Figure 2:
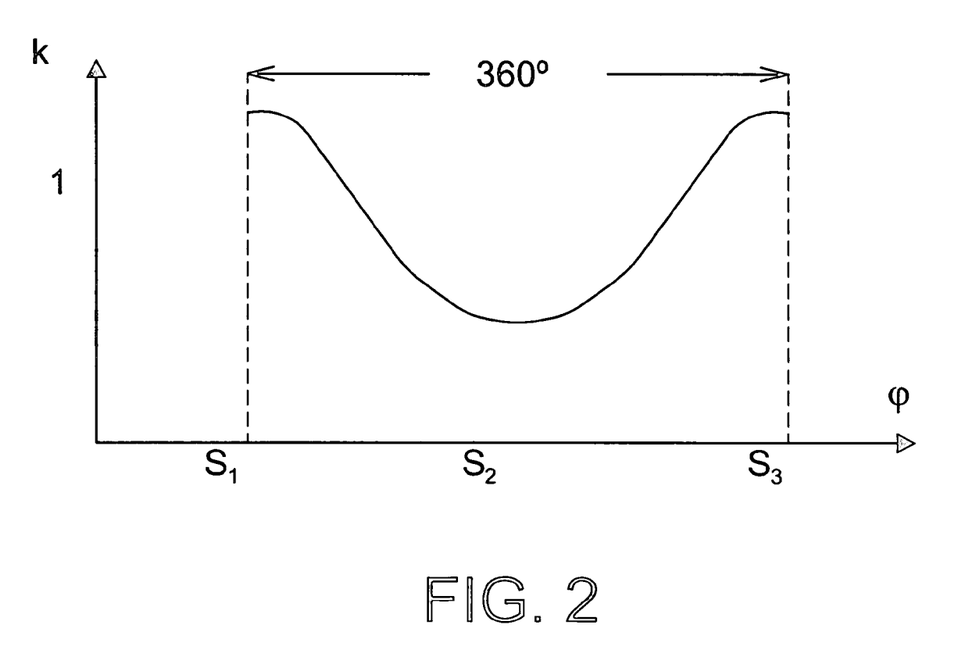

In principle, the initial and final positions of the actuator may be any one. However, in the event that the initial position (point S1) and in the final position of the actuator (point S3), the lever arm (7) is parallel to the mobile link (5) and is oriented in the direction opposite the rotation axis of the mobile link (5), the maximum interest is represented. In this case, the working element may be moved by continuously rotating the lever arm 360 degrees with the help of the motor, after which the rotation of the lever arm stops. With this movement of the lever arm, the mobile link will also rotate 360 degrees and the working element will rotate a certain angle determined by the pace ratio of the kinematic connection between the mobile link and the working element (if a rack and pinion mechanism is used, then the working element will move progressively and not in a rotating manner). For example, if the ratio of paces is equal to four, then the working element will rotate 90 degrees. The next movement of the lever arm may be carried out in the same direction or in the opposite direction. Accordingly, the working element will rotate another 90 degrees and will return to the initial position. In such a condition, the actuator in question may practically operate like a pace actuator. However, unlike the traditional pace actuator that has a constant pace ratio, the proposed actuator differs in that its pace ratio is not constant, but rather it depends on the rotation angle of the lever arm (FIG. 2). When movement starts the pace ratio is maximum (this ensures high acceleration). Afterwards, the pace ratio decreases little by little up to the middle position of the lever arm (this ensures the possibility of moving the working element at a high speed). Once the lever arm goes beyond the middle position the pace ration begins to increase and it becomes maximum in the final position (this ensures the possibility of intense braking of the working element). In this way a high speed of action of the actuator is ensured. Besides, at the expense of the changing pace ratio a higher engine efficiency of the actuator is ensured because its speed is going to be practically constant in a considerable part of the path, without having to take into account that the speed of the working element is going to change considerably.

Figure 3:
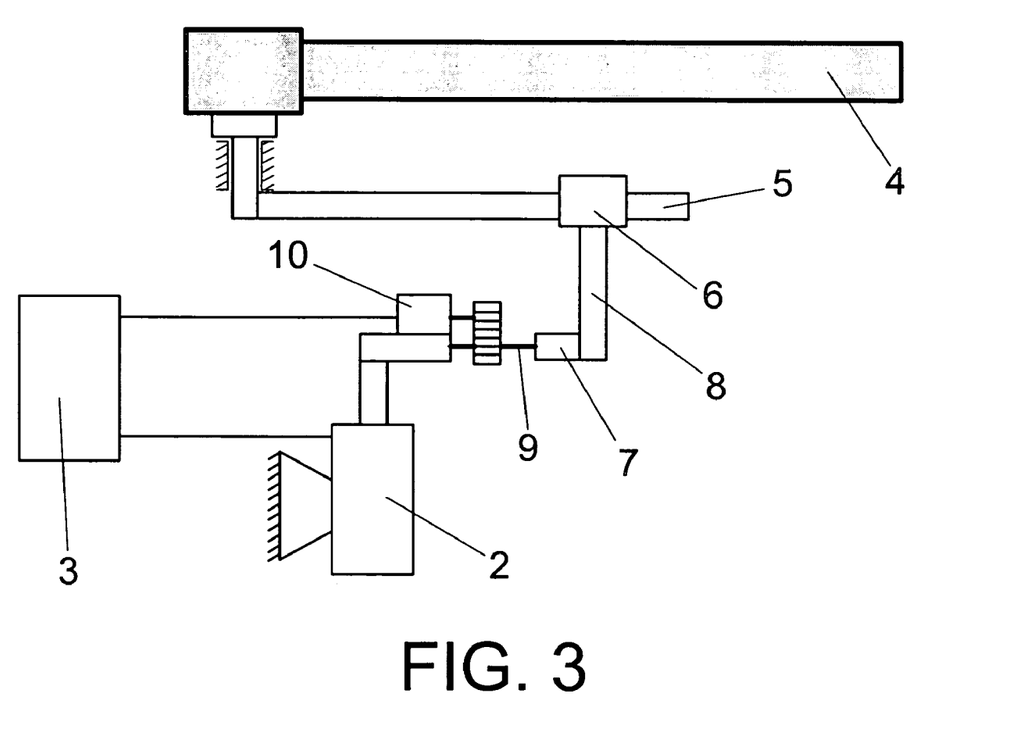

The case wherein the movement of the lever arm (7) is carried out in the surrounding area of the position is also interesting, when the lever arm (7) is parallel to the mobile link (5) and is oriented in the direction of the rotation axis of the mobile link (5) (point S2). In this case the actuator may be used efficiently for walking machines, in particular, for a biped robot. For example, when the working element (4) of the actuator represents a leg of the biped robot and the base (1) of the actuator represents the body of the robot. When the legs rests on the surface upon which the robot moves and the body of the robot is placed vertically, the lever arm (7) is parallel to the mobile link (5) and is oriented in the direction of the rotation axis of the mobile link (5). In this position the motor-working element pace ratio has a minimum value, and in the deviations of the body of the robot from the vertical position the pace ration increases. The load on the actuator performs analogically; hence, in the vertical position of the body of the robot the load has a minimum value and in the deviations of the body of the robot from the vertical position, the load increases. In this way, the actuator in question automatically adapts to the variable outside load at the expense of the change of the pace ratio. This adaptation is especially important with big loads on the actuator (in the example in question it corresponds to big deviations of the body of the robot from the vertical position), which allows the use of a less powerful actuator motor maintaining a high speed of action of the actuator with small loads. If the actuator has an adjusting device that permits adjustment of the length of the lever arm (7), then this device permits adjustment of the dependency of the pace ratio of the actuator of the rotation angle of the lever arm (or of the working element) for optimum correlation of the actuator with the load (FIG. 3). And if the adjusting device has the adjusting motor (10) then adjustment may be done directly during the moving process of the actuator. In this case, adaptation of the actuator to the load that depends not only on the rotation angle of the body of the robot may be assured (for example, if during the slanting process the robot takes a heavy load in the hand).

Figure 4:
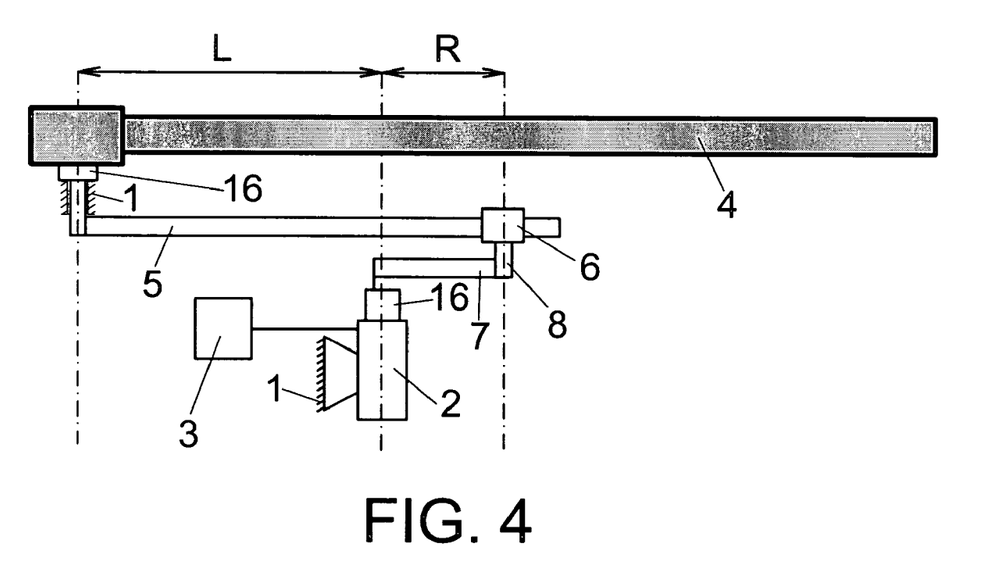
Figure 5:
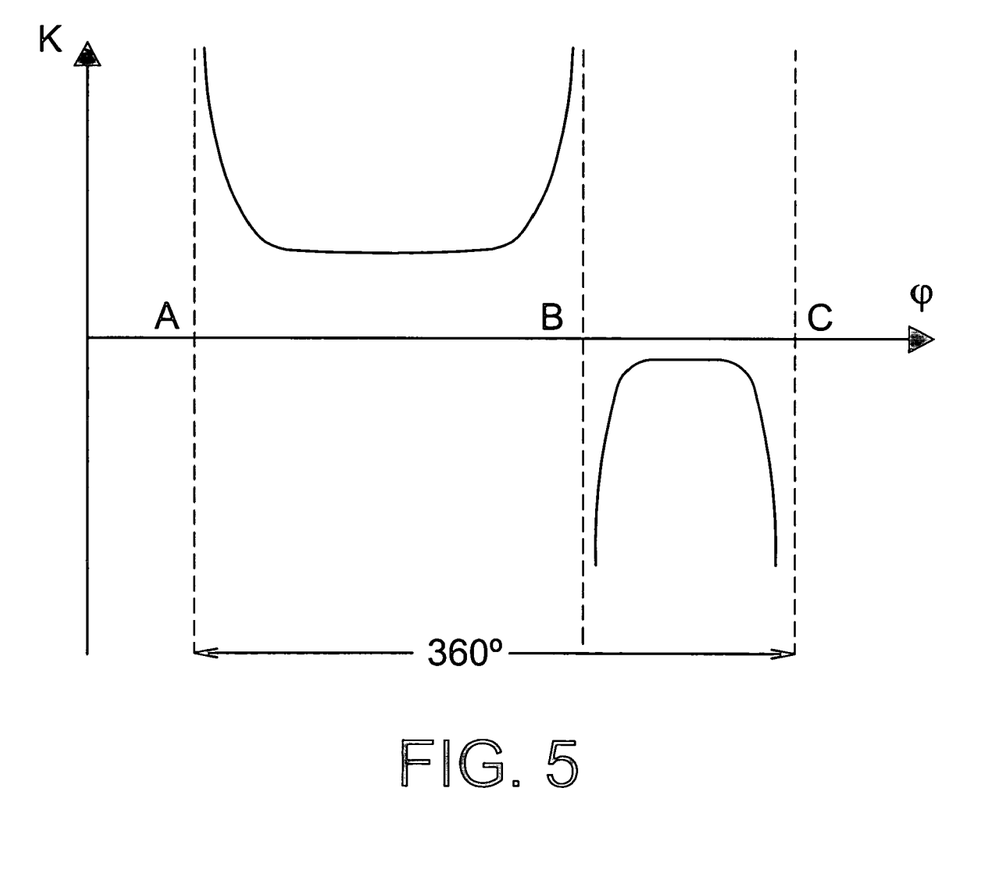
Figure 6:
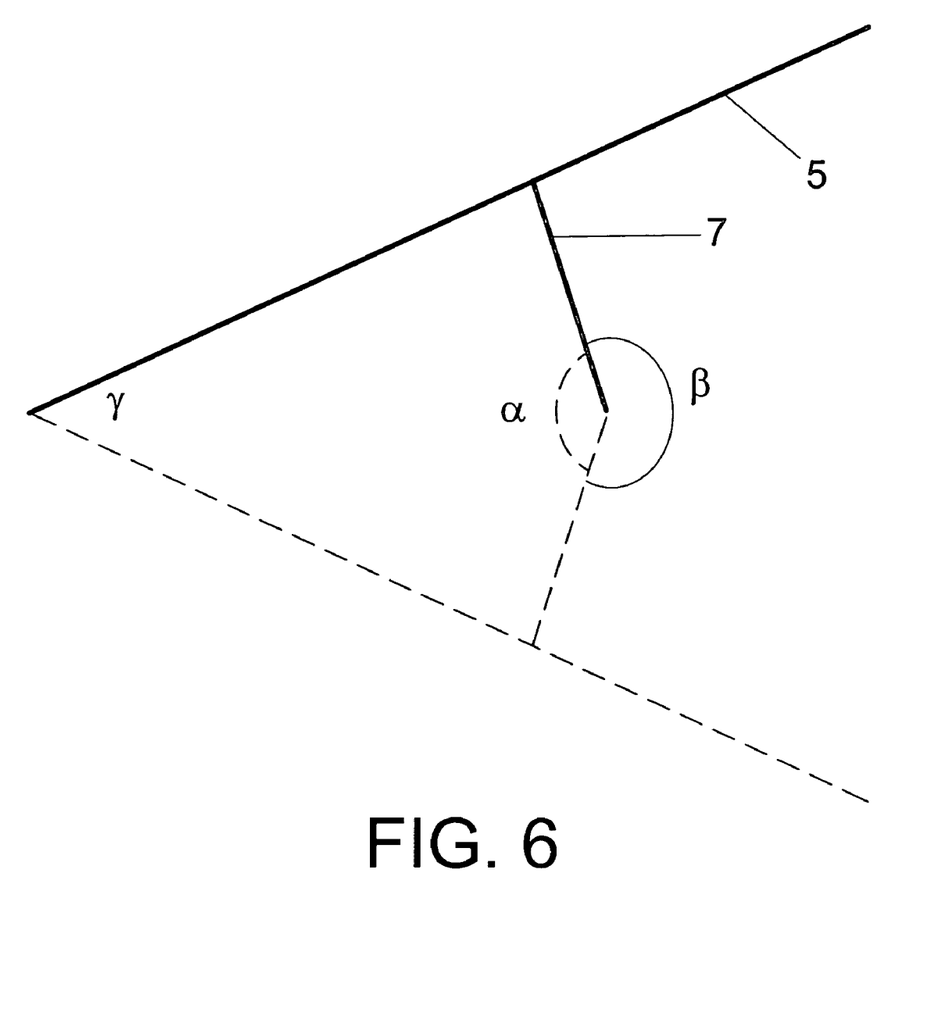

Condition II. The operating of the actuator in the case wherein the length of the lever arm (7) is shorter than the distance between the lines that run along the entire rotation axis of the mobile link (5) and along the entire rotation axis of the lever arm (7) is carried out analogically (FIG. 4). The difference in this case does not lie on in this case on the dependency of the pace ratio of the actuator of the rotation angle of the lever arm has a completely different nature (FIG. 5). This dependency has a periodic nature, with a period of 360 degrees and within said period it is possible to distinguish between two parts, one part with positive values of the pace ration (section A-B) and another part with negative values (section B-c). The negative value of the pace ration means that the lever arm and the mobile link rotate in opposition directions. In points A, B and C the pace ratio tends more or less infinite. These points correspond to the positions wherein between the lever arm and the mobile link there is a 90 degree angle. At these points, the slant of the mobile link from its middle position is going to be maximum. Correspondingly at these same points the slant of the working element (kinematically connected to the mobile link by means of a transmitting mechanism with the pace ratio constant) from its middle position is also going to be maximum. At each position of the mobile link within its limitation of movement (with the exception of the end points) two positions of the lever arm correspond to it, one inside the limits of angle α and the other one inside the limits of angle β (FIG. 6). Moving the mobile link from one position to any other position may be done in two ways: moving the lever arm within the limits of angle α or within the limits of angle β. And the pace ratio between the motor and the working element essentially depends on inside which limits the angles the lever arm moves. If movement is done within the limits of angle α, the absolute magnitude of the pace ratio is going to be lower than in the movement produced inside the limits of angle β. This makes it possible to use the movement of the lever arm inside the limits of an angle, when the load is small (and to obtain high moving speeds) or within the limits of the other angle, when the load on the actuator is big (and with this to have slower moving speeds). The passing from some working angles to others is done with the help of moving the lever arm by means of the critical point (A, B or C). The control system receives information regarding the position of the elements of the actuator of the angle sensor between the mobile link and the lever arm (variants: of the motor position sensor, mobile position sensor or the working element with respect to the base) and the corresponding voltage is applied to the motor (2). These properties of the actuator may be useful, for example, in the use of robots when a movement is carried out with a load in the grip of the robot (a great inertia load) and the other is carried out without a load (small load). The case of maximum interest is when in the initial position and in the final position of the actuator the lever arm (7) is perpendicular to the mobile link (5) (in other words, movement is carried out from an end position of the mobile link to the other end). In this case the actuator ensures an optimum change in the pace ratio in order to keep high accelerations of the working element at the beginning and at the end of the movement) (a high absolute magnitude of the pace ratio) and to keep high speeds in the middle part of the path (a low absolute magnitude of the pace ratio): And the passing may be done either inside the limit of angle α or within the limits of angle β depending on the direction of rotation of the lever arm (and correspondingly the motor). Since the pace ratios in these movements differ in their magnitude, this may be used in systems wherein the outside load (inertia or force) changes considerably. For example, when moving the hand with the load of the robot in one direction and the hand without a load of the robot in the other direction. Another example for using the actuator is in a walking robot whose leg actuator has to alternately move the leg of the robot in the air and then the body of the robot in relation to the led that rests on the surface. Since the loads in these movements are considerably different, a movement may be carried out very rapidly by rotating a motor in one direction and the following movement may be done slowly by rotating the motor in the opposite direction. In this way the actuator allows the working element to move from one position to another and two have two different laws of change of pace ratio of the actuator depending on the direction in which the motor moves.

Just like before, the presence of an adjusting device allows changes of dependency to be made regarding the pace ratio of the actuator of the rotation angle of the lever arm. Nonetheless, unlike the above-cited case, the change of the length of the lever arm simultaneously involves the maximum possible change of slant of the mobile link (and correspondingly of the working element) from the middle position.

With a sufficient reservation of the length of the lever arm, the actuator itself may operate in condition I and in condition II, and the passing between the two conditions is done at the expense of changing the length of the lever arm. This passing may be done with the actuator inoperative or when it is operating (in this case the adjusting motor is used).

Figure 7:
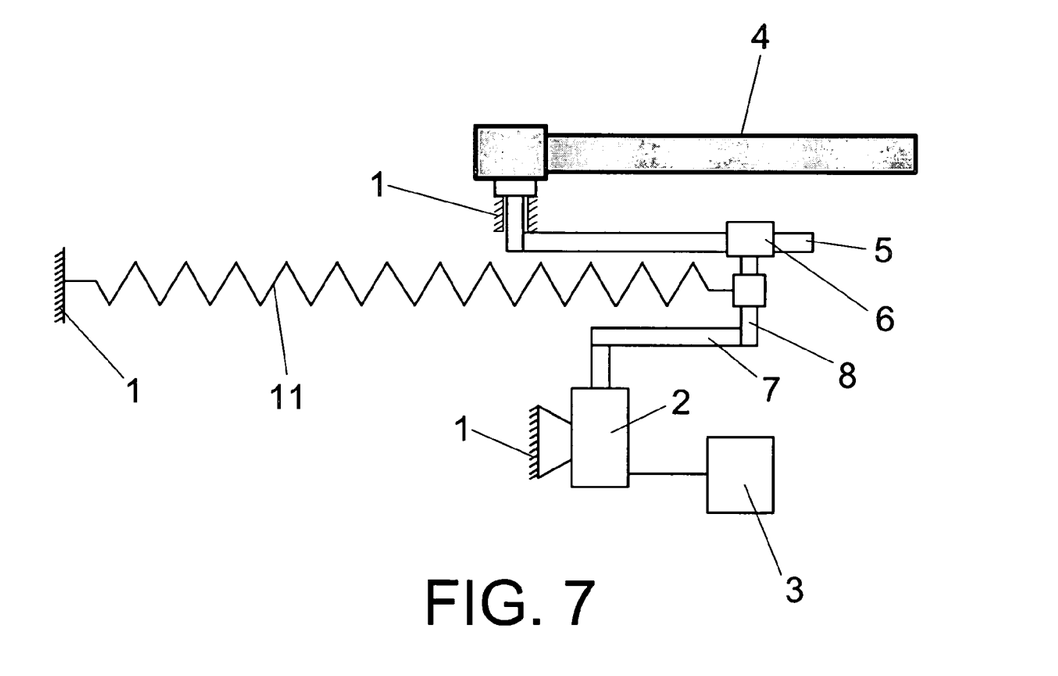

An additional increase of the efficiency of the actuator may be obtained at the expense of the use of springs. This proves to be useful for compensation of inertia loads (dynamic process) and for compensation of force loads (quasi-static process). For example, for the actuator that operates under conditions I, one of the ends of the elastic element (comprised of one or several springs) may be fastened to the base of the actuator, and the other end may be connected by means of hinges with the pin of the lever arm. The fastening point of the spring to the base, the rotation axis of the mobile link and the rotation axis of the lever arm may be in a line of the plane parallel to the rotation plane of the lever arm, and the spring may be drawn in all the positions of the lever arm. If the actuator mainly has an inertia load and for the embodiment of the working pace the lever arm is moved 360 degrees (pace actuator), then the fastening point of the elastic element to the base is placed outside the segment that connects the rotation axis of the mobile link and the lever arm at the side of the rotation axis of the mobile link (FIG. 7). In the initial position the lever arm is in an unstable equilibrium state. Once movement begins, the elastic element pushes the lever arm in the direction of rotation thereof (angles from 0 to 180 degrees), which favors the movement of the lever arm, of the working element and of the mobile link (inertia load). After passing the middle position, when the system has a high speed and correspondingly a high kinetic energy, the elastic element pushes the lever arm in the direction opposite its direction of movement (angles of 180 to 360 degrees), which favors intense braking of the elements. The accumulated kinetic energy converts into the potential energy of the drawn elastic element. Afterwards, the process is repeated. In the initial position the actuator is retained by the motor or by the special position fastener (for example, in the form of a mechanical latch with springs that automatically closes the lever arm when the latter reaches the final position), that is unfastened (for example, with the help of a special electromagnet) before the following movement begins.

Figure 8:
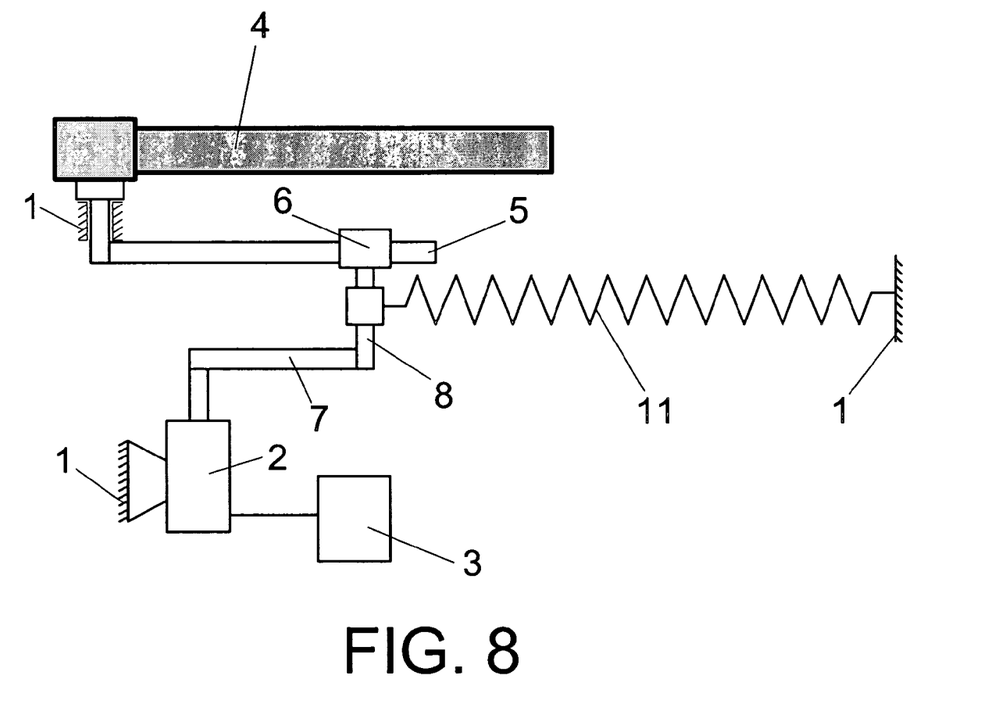

If the actuator moves around one of the positions of the lever arm and the load mainly has a force nature and is oriented in the same direction in which the slant of this position began (for example, in the case of suing the actuator in a biped robot), then such position of the lever arm when the lever arm (7) is parallel to the mobile link and oriented in the direction of rotation of the mobile link (FIG. 8) may be used as the initial position. In this case, the elastic element is going to automatically compensate (partially or totally) the outside load, which makes it possible to use a less powerful motor. If the force load has its minimum value, not in the initial position of the lever arm, but rather with a certain slant of the initial position, then the fastening point of the elastic element to the base may be moved correspondingly in the direction outward from the line that passes through the rotation axis of the lever arm and of the mobile link.

Figure 9:
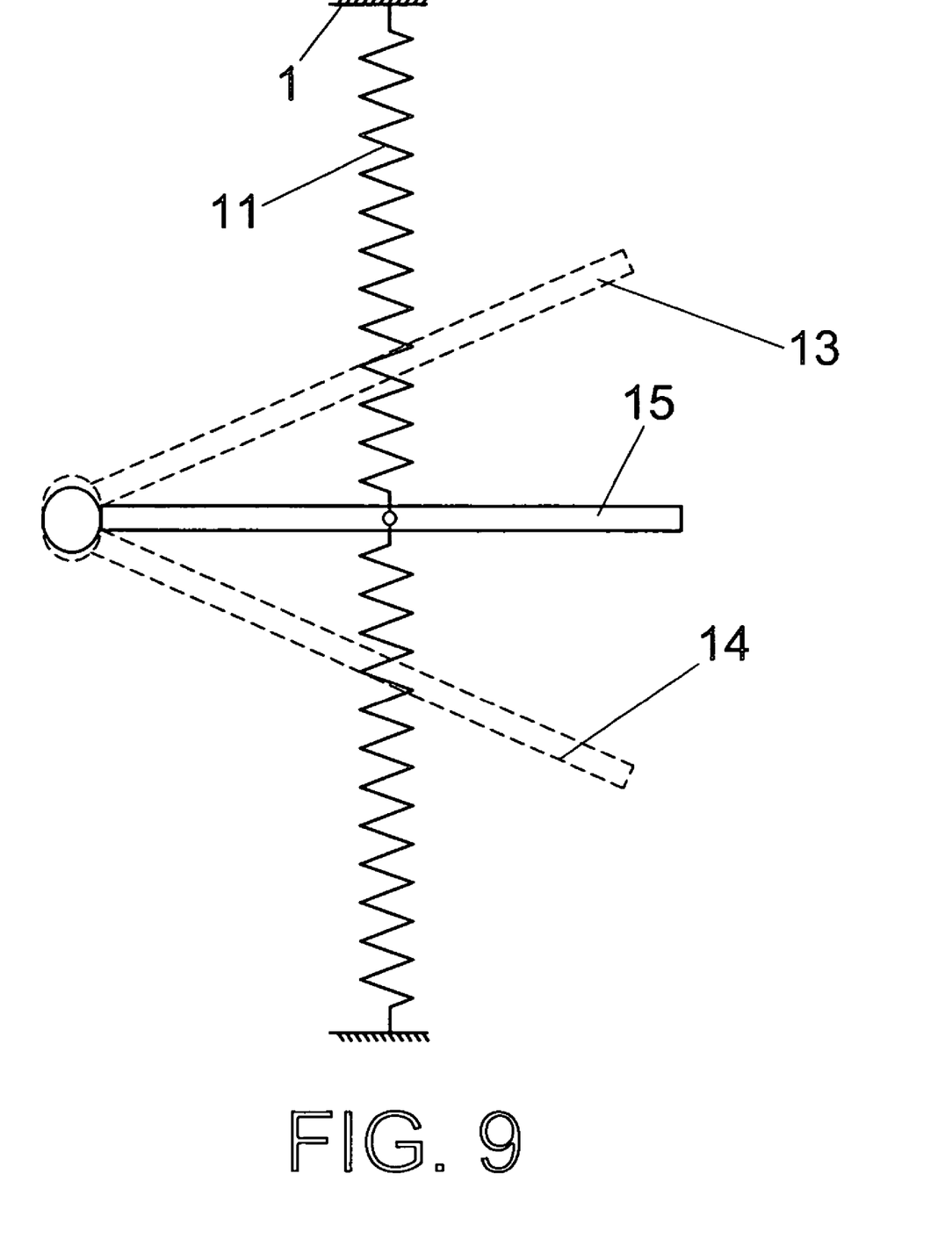
Figure 10:
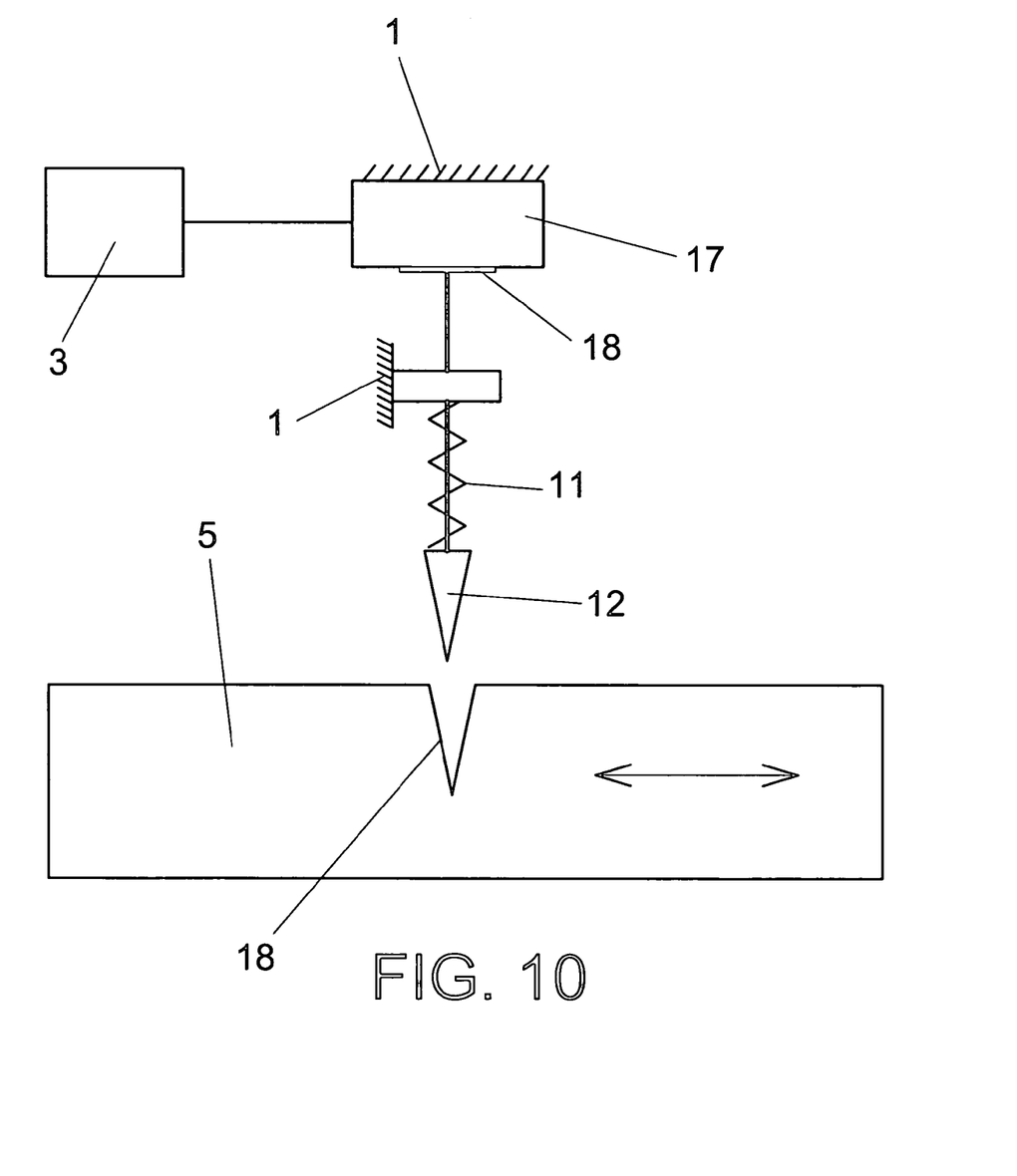
Figure 11:
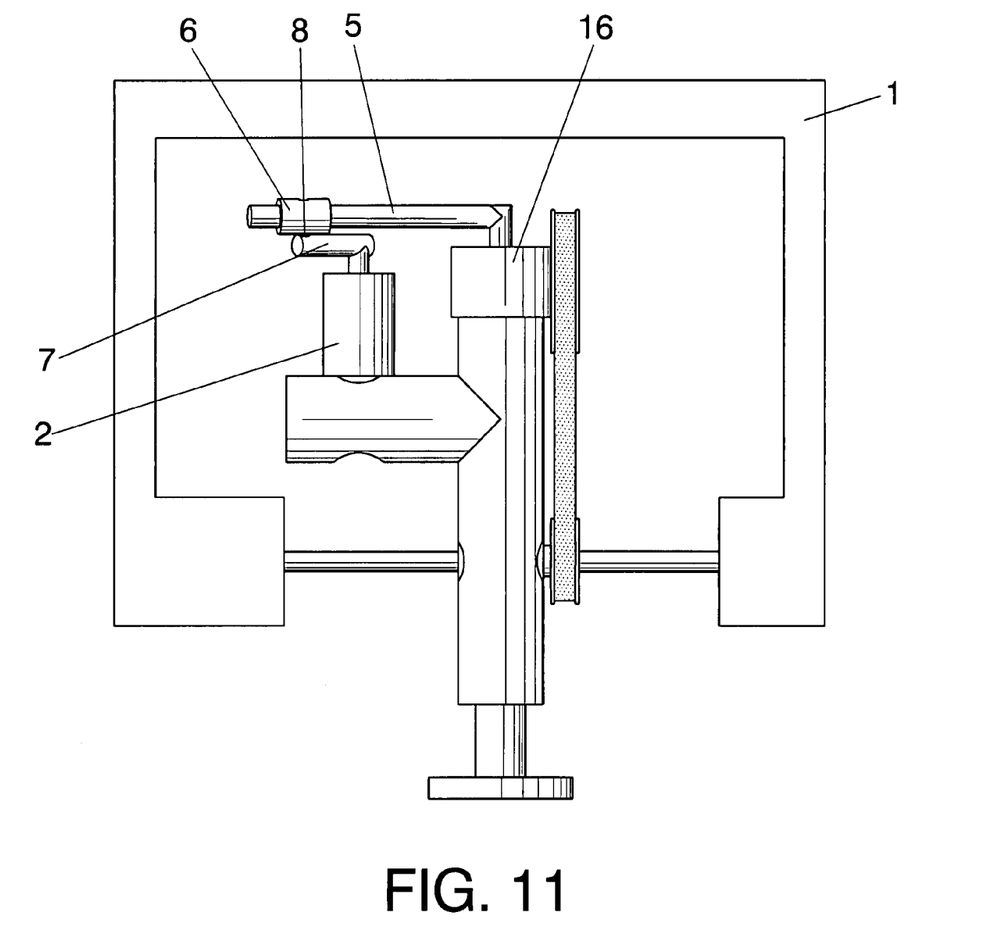

If the actuator operations under conditions II, then another method of fastening the elastic element may be used. In this case the elastic element may be fastened to the mobile link or to the working element (for example, to the mobile link) by one end, and by the other end to the base. The elastic element may be comprised of two springs, each one of which is in a drawn state (or compressed) upon moving the mobile fastening point in the entire range of movements (FIG. 9). The springs are adjusted in such a way that the working element occupies the middle position with the motor turned off. In the end positions, the mobile link or working element is retained by fasteners (FIG. 10). The fastener should be unfastened before movement begins. Under the action of the elastic element, the mobile link begins intensive acceleration up to the middle position, which is followed by intensive braking and when the end position is reached same is automatically closed with the fastener. The motor does not considerably influence the kind of movement, but rather it serves to compensate losses during movement. This makes it possible to obtain high speeds of movement with small energy consumption.

BRIEF DESCRIPTION OF THE DRAWINGS

The invention is described in detail hereinafter by means of two examples and making reference to the attached figures.

DESCRIPTION OF AN EMBODIMENT OF THE INVENTION

Example 1

The actuator of the working element has the motor (2) fastened to the base (1), connected to the control system (3). The motor is kinematically connected to the working element (4). The kinematic connection between the motor (2)

and the working element (4) has the mobile fastener (5), fastened to the base (1) with the possibility of rotation, the runner (6), placed on the mobile link (5) and the lever arm (7) connected to the motor (2). The runner (6) is fastened to the mobile link (5) with the possibility of sliding along the entire mobile link (5) radially. The lever arm (7) is hinge connected by the cylindrical pin (8) with the runner (6). The mobile link (5) is connected to the working element (4) with the help of the reducer series connected and of the rack and pinion mechanism. The rotation axes of the mobile link (5), of the lever arm (7) and of the pin (8) parallel.

Example 2

The actuator of the working element has the motor (2) fastened to the base (1), connected to the control system (3). The motor (2) is kinematically connected to the working element (4). The kinematic connection between the motor (2) and the working element (4) has the mobile link (5), fastened to the base (1) with the possibility of rotation, the runner (6) placed on the mobile link (5) and the lever arm (7) connected by way of the reducer to the motor (20. The runner (6) is fastened to the mobile link radially with the possibility of sliding along the entire mobile link (5). The lever arm (7) is hinged-connected by means of the cylindrical pin to the runner (6). The mobile link (5) is connected to the working element (4) by means of a series fastened reducer and a rack and pinion mechanism. The rotation axes of the mobile link (5), of the lever arm (7) and of the pin is parallel. The distance between the lines that pass through the entire rotation shafts of the mobile link (5) and along the entire rotation axes of the lever arm (7) is longer than the length of the lever arm (7).

The invention claimed is:

1. Actuator of a working element, mainly a walking robot, that has a control system, a base of the actuator with a motor fastened thereto, connected to the control system and kinematically connected to the working element, wherein the kinematic connection between the motor and the working element of the robot has a mobile link, fastened to the base of the actuator with the possibility of rotating, a runner placed on the mobile link with the possibility of sliding radially along the entire mobile link, a lever arm kinematically connected to the motor, hinge-connected by a pin to the runner, in such a way that the rotation axis of the mobile link, the rotation axis of the lever arm and the rotation axis of the pin are parallel, and the mobile link is kinematically connected to the working element.

2. Actuator of a working element, according to claim 1, wherein the distance between the rotation axis of the mobile link and the rotation axis of the lever arm is longer than the length of the lever arm.

3. Actuator of a working element, according to claim 1, wherein the distance between the rotation axis of the mobile link and the rotation axis of the lever arm is shorter than the length of the lever arm.

4. Actuator of a working element, according to claim 1, wherein the lever arm has an adjusting device, that ensures the possibility of adjusting the length of the lever arm.

5. Actuator of a working element, according to claim 4, wherein the adjusting device of the lever arm has an adjusting motor connected to the control system.

6. Actuator of a working element, according to claim 1, wherein said actuator of a working element has a sensor of the rotation angle of the motor and this sensor is connected to the control system.

7. Actuator of a working element, according to claim 5, wherein said actuator of a working element has a sensor of the rotation angle of the adjusting motor, and this sensor is connected to the control system.

8. Actuator of a working element, according to claim 1, wherein said actuator of a working element has a sensor of the angle between the lever arm and the mobile link and this sensor is connected to the control system.

9. Actuator of a working element, according to claim 1, wherein the kinematic connection between the motor and the lever arm has a reducer.

10. Actuator of a working element, according to claim 1, wherein the kinematic connection between the mobile link and the working element has a reducer.

11. Actuator of a working element, according to claim 1, wherein the kinematic connection between the mobile link and the working element has a rack-pinion mechanism.

12. Actuator of a working element, according to claim 1, wherein the actuator has a system of elastic elements, said system of elastic elements having at least one elastic element, the elastic element having a first end connected to the mobile link and a second end connected to the base of the actuator.

13. Actuator of a working element, according to claim 1, wherein the actuator has a system of elastic elements, said system of elastic elements having at least one elastic element, the elastic element having a first end connected to the working element of the robot and a second end connected to the base of the actuator.

14. Actuator of a working element, according to claim 12, wherein the system of elastic elements sets the mobile link in a stable equilibrium when the lever arm is in a position parallel to said mobile link.

15. Actuator of a working element, according to claim 1, wherein the actuator has a fastener which fastens at least one position of the working element, or at least one position of the mobile link or at least one position of the lever arm.

16. Control method of the actuator of claim 1, wherein at least in one part of the path of the working element, said working element stops in positions when the angle between the lever arm and the mobile link is 90 degrees, and said working element begins to move, the lever arm rotating with the help of the motor in the direction of the direction of rotation of the rotation axis of the mobile link in the case when the corresponding leg of the robot does not rest on the surface, and in the direction of the opposite direction of rotation of the rotation axis of the mobile link when the corresponding leg of the robot rests on the surface.

17. Control method of the actuator of claim 1, wherein at least in one part of the path of the working element, said working element stops in the position when the lever arm is parallel to the mobile link, and said working element is oriented in the direction of the opposite direction of rotation of the rotation axis of the mobile link, the motion of the working element is carried out by constantly rotating the lever arm an angle of 360 degrees with the help of the motor, after which the rotation of the lever arm ends.

18. Actuator of a working element, according to claim 1, wherein the actuator has a system of elastic elements, said system of elastic elements having at least one elastic element, the elastic element having a first end connected to the lever arm and a second end connected to the base of the actuator.

19. Actuator of a working element, according to claim 1, mainly for a walking robot, wherein the base of the actuator is the body of the robot, and the working element is a leg of the robot.

20. Control method of the actuator according to claim 1, wherein the motion of the working element is achieved by means of the mobile link, rotating the lever arm assisted by the motor, and the starting and stop positions of the actuator are determined by the value of the angle formed between the lever arm and the mobile link, said value being defined by the control system.

21. Control method of the actuator according to claim 1, wherein the length of the lever arm can be changed with the help of the adjusting motor during the moving process of said lever arm.

* * * * *